United States Patent
Yanada et al.

(10) Patent No.: US 9,277,145 B2
(45) Date of Patent: Mar. 1, 2016

(54) IMAGING DEVICE DIVIDING IMAGING REGION INTO FIRST DIVIDED IMAGE DATA AND SECOND DIVIDED IMAGE DATA

(71) Applicant: OLYMPUS CORPORATION, Tokyo (JP)

(72) Inventors: Takashi Yanada, Tokyo (JP); Yoshinobu Tanaka, Tokyo (JP); Tomoyuki Sengoku, Tokyo (JP); Masami Shimamura, Hanno (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 58 days.

(21) Appl. No.: 14/073,075

(22) Filed: Nov. 6, 2013

(65) Prior Publication Data

US 2014/0176763 A1    Jun. 26, 2014

(30) Foreign Application Priority Data

Dec. 25, 2012    (JP) ................................. 2012-281277

(51) Int. Cl.
*H04N 5/341*    (2011.01)
*H04N 5/335*    (2011.01)

(52) U.S. Cl.
CPC ............. *H04N 5/3415* (2013.01); *H04N 5/335* (2013.01)

(58) Field of Classification Search
CPC .................................................. G06T 2210/52
USPC ................. 348/222.1, 231.99; 382/302, 304; 700/2, 4
See application file for complete search history.

(56) References Cited

U.S. PATENT DOCUMENTS

| | | | | |
|---|---|---|---|---|
| 5,523,788 A | * | 6/1996 | Kannegundla | H04N 5/335 348/222.1 |
| 7,027,665 B1 | * | 4/2006 | Kagle | G06K 9/4652 382/173 |
| 2010/0238315 A1 | * | 9/2010 | Shiomi | 348/222.1 |
| 2010/0260428 A1 | * | 10/2010 | Ueno et al. | 382/232 |

FOREIGN PATENT DOCUMENTS

| | | |
|---|---|---|
| JP | 2010-103935 A | 5/2010 |
| JP | 2010-199880 A | 9/2010 |

* cited by examiner

*Primary Examiner* — Sinh Tran
*Assistant Examiner* — Mark Monk
(74) *Attorney, Agent, or Firm* — Westerman, Hattori, Daniels & Adrian, LLP

(57) ABSTRACT

An imaging device is provided which includes a solid-state imaging device that includes a plurality of pixels arranged in a form of a two-dimensional (2D) matrix, and outputs pixel signals corresponding to subject light incident on the plurality of pixels, and a plurality of image-acquiring units that acquire the pixel signals output from the solid-state imaging device, and output image data corresponding to the acquired pixel signals, wherein each of the plurality of image-acquiring units acquires pixel signals of one of divisional imaging regions obtained by dividing an imaging region in which all pixels arranged in the solid-state imaging device image the subject light by the number of image-acquiring units, and outputs image data corresponding to the acquired pixel signal of the divisional imaging region as divisional image data.

20 Claims, 10 Drawing Sheets

IMAGING DEVICE DIVIDING IMAGING REGION INTO FIRST DIVIDED IMAGE DATA AND SECOND DIVIDED IMAGE DATA

BACKGROUND OF THE INVENTION

1. Field of the Invention

The present invention relates to an imaging device.

Priority is claimed on Japanese Patent Application No. 2012-281277, filed Dec. 25, 2012, the content of which is incorporated herein by reference.

2. Description of Related Art

A general imaging device such as a digital still camera or video camera includes an image-acquiring unit that acquires a pixel signal output from a solid-state imaging device and the remaining components. For example, an imaging device is configured such that an image-acquiring unit and the remaining components are connected to a dynamic random access memory (DRAM) that temporarily stores data via a data bus (see Japanese Unexamined Patent Application, First Publication No. 2010-199880A). Further, when photography is performed with the imaging device, the image-acquiring unit transfers image data according to a pixel signal acquired from a solid-state imaging device to the DRAM via the data bus and causes the image data to be stored (written) in the DRAM. Further, when photography is performed with the imaging device, the remaining components read the image data stored in the DRAM and respective corresponding processes.

Each of the image-acquiring unit and the remaining components equipped in the imaging device includes a direct memory access-interface (DMA-IF) used to exchange data with direct memory access (DMA). Each DMA-IF includes a memory such as a static random access memory (SRAM) as an internal data buffer.

In the past, imaging devices having a constitution in which a plurality of image-processing units that perform image processing on image data which has been acquired from a solid-state imaging device and then stored (written) in a DRAM by an image-acquiring unit are provided, and the image-processing units perform image processing in parallel have been put to practical use. In the imaging device including the plurality of image-processing units, as image data stored in the DRAM is simultaneously subjected to image processing, a function of simultaneously performing shooting of different types or different sizes (angles of view) is implemented. Examples of a function of simultaneously performing shooting of different types or different sizes (angles of view) include a function of shooting a still image while shooting a moving image and a function of shooting a wide-angle (wide) moving image and a telescopic (tele) moving image.

For example, an imaging device that simultaneously shoots a moving image and a still image includes a still image-processing unit and a moving image-processing unit. The still image-processing unit performs image processing on image data of an overall region to be imaged by the solid-state imaging device. The moving image-processing unit performs image processing on image data of a region smaller than that in the still image-processing unit.

Further, for example, an imaging device that simultaneously shoots a wide-angle image and a telescopic image includes a wide-angle image-processing unit and a telescopic image-processing unit. The wide-angle image-processing unit performs image processing on image data of an overall region to be imaged by the solid-state imaging device. Further, the telescopic image-processing unit performs image processing on image data of a telescopic region partially clipped from an overall region to be imaged by the solid-state imaging device.

Further, in recent years, solid-state imaging devices that simultaneously output a plurality of pixel signals, for example, pixel signals of two pixels adjacent in a horizontal direction or pixel signals of two pixels adjacent in a vertical direction, have been put to practical use.

Furthermore, an imaging device in which a plurality of image-processing units are provided to reduce a load of image processing to be performed on image data corresponding to a pixel signal acquired from a solid-state imaging device has been disclosed, for example, in Japanese Unexamined Patent Application, First Publication No. 2010-103935A. In the technique disclosed in "2010-103935A", one of the image-processing units first sequentially reads accumulated image data and performs image processing while sequentially accumulating image data corresponding to one frame at the time of continuous shooting. Then, when the remaining capacity of the buffer memory is small, another image-processing unit is activated, and the two image-processing units alternately read image data stored in the buffer memory and perform image processing in parallel.

SUMMARY OF THE INVENTION

According to a first aspect of the present invention, an imaging device includes a solid-state imaging device that includes a plurality of pixels arranged in a form of a two-dimensional (2D) matrix, and outputs pixel signals corresponding to subject light incident on the plurality of pixels, and a plurality of image-acquiring units that acquire the pixel signals output from the solid-state imaging device, and output image data corresponding to the acquired pixel signals, wherein each of the plurality of image-acquiring units acquires pixel signals of one of divisional imaging regions obtained by dividing an imaging region in which all pixels arranged in the solid-state imaging device image the subject light by the number of image-acquiring units, and outputs image data corresponding to the acquired pixel signal of the divisional imaging region as divisional image data.

According to a second aspect of the present invention, in the imaging device according to the first aspect, the plurality of image-acquiring units may correspond to the respective different divisional imaging regions, and each of the image-acquiring units may acquire the pixel signals of the corresponding divisional imaging region among the pixel signals sequentially output from the solid-state imaging device, and sequentially output the divisional image data corresponding to the acquired pixel signals.

According to a third aspect of the present invention, in the imaging device according to the second aspect, the image-acquiring unit may include a pixel signal-processing unit that generates processed image data by performing predetermined processing on the acquired pixel signals, and outputs the processed image data, and an image data transfer unit that transfers the processed image data to a storage unit connected to a data bus to which the image-acquiring unit is connected as the divisional image data of the corresponding divisional imaging region.

According to a fourth aspect of the present invention, in the imaging device according to the third aspect, the pixel signal-processing unit may sequentially acquire the pixel signals of the corresponding divisional imaging region at a timing synchronized with a first clock signal, and sequentially output the generated processed image data at a timing synchronized with a second clock signal, and the image data transfer unit may transfer the processed image data to the storage unit at the timing synchronized with the second clock signal as the divisional image data.

According to a fifth aspect of the present invention, in the imaging device according to the fourth aspect, a period of the first clock signal may be a period at which the solid-state imaging device sequentially outputs the pixel signal, and a period of the second clock signal may be within a period obtained by multiplying the period of the first clock signal by the number of image-acquiring units provided in the imaging device.

According to a sixth aspect of the present invention, in the imaging device according to the fifth aspect, the pixel signal-processing unit may include a buffer unit that sequentially holds image data corresponding to the pixel signals at the timing synchronized with the first clock signal, and outputs the held image data at the timing synchronized with the second clock signal.

According to a seventh aspect of the present invention, in the imaging device according to the sixth aspect, the pixel signal-processing unit may include a horizontal direction-resizing unit that sequentially outputs horizontally processed image data obtained by performing a resizing process on the pixel signals corresponding to the pixels arranged in a column direction in the solid-state imaging device, and a vertical direction-resizing unit that sequentially outputs vertically processed image data obtained by performing a resizing process on the horizontally processed image data in a row direction in the pixels arranged in the solid-state imaging device, and the vertical direction-resizing unit may include the buffer unit, cause the horizontally processed image data to be sequentially held in the buffer unit at the timing synchronized with the first clock signal, and sequentially output the vertically processed image data obtained by performing the resizing process in the column direction on the horizontally processed image data sequentially read from the buffer unit at the timing synchronized with the second clock signal.

According to an eighth aspect of the present invention, in the imaging device according to any one of the first to seventh aspects, the number of image-acquiring units may be two, the imaging region may be divided into two, one of the image-acquiring units may output image data corresponding to the pixel signals acquired from one of the two divisional imaging regions divided from the imaging region as first divisional image data, and the other of the image-acquiring units may output image data corresponding to the pixel signals acquired from the other of the two divisional imaging regions divided from the imaging region as second divisional image data.

According to a ninth aspect of the present invention, in the imaging device according to the eighth aspect, the imaging region may be divided into left and right regions, one of the image-acquiring units may output image data corresponding to the pixel signals acquired from the left region of the two divisional imaging regions divided from the imaging region as first divisional image data, and the other of the image-acquiring units may output image data corresponding to the pixel signals acquired from the right region of the two divisional imaging regions divided from the imaging region as second divisional image data.

According to a tenth aspect of the present invention, in the imaging device according to the ninth aspect, the left divisional imaging region and the right divisional imaging region may be adjacent to each other at a position at which the imaging region is divided.

According to an eleventh aspect of the present invention, in the imaging device according to the ninth aspect, when each of the image-acquiring units performs a filter process or a resizing process on the acquired pixel signals, the left divisional imaging region and the right divisional imaging region may have marginal regions which are adjacent to each other at a position at which the imaging region is divided, and the pixel signals included in the left divisional imaging region and the right divisional imaging region may overlap in the marginal regions.

According to a twelfth aspect of the present invention, in the imaging device according to the eleventh aspect, an amount of pixel signals included in the marginal regions may be decided according to the number of taps of a filter used in the filter process or the resizing process performed by each of the image-acquiring units.

DETAILED DESCRIPTION OF THE INVENTION

Hereinafter, an embodiment of the present invention will be described with reference to the appended drawings. It should be understood by those skilled in the art based on the present disclosure that the present invention merely describes, but not intended to limit, the invention set forth in the appended claims and an equivalent thereto.

Figure 1:
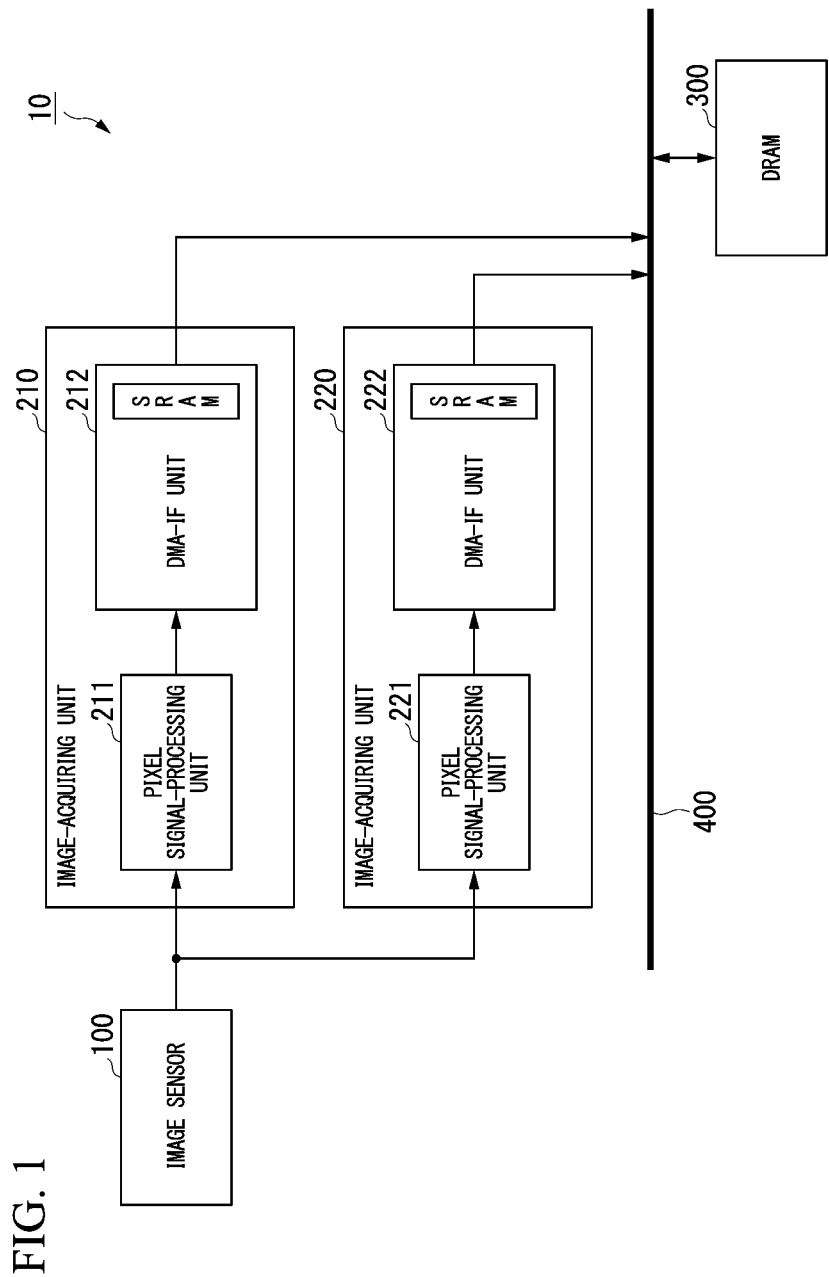
FIG. 1 is a block diagram illustrating schematic constitutions of components related to image acquisition in an imaging device according to an embodiment of the present invention.

FIG. 1 is a block diagram illustrating schematic constitutions of components related to image acquisition in an imaging device according to the present embodiment. Referring to FIG. 1, an imaging device 10 includes an image sensor 100, two image-acquiring units 210 and 220, and a DRAM 300. The image-acquiring unit 210, the image-acquiring unit 220, and the DRAM 300 in the imaging device 10 are connected with one another via a data bus 400. For example, the image-acquiring unit 210, the image-acquiring unit 220, and the DRAM 300 perform an operation of writing data in the DRAM 300 and an operation of reading data from the DRAM 300 through the DMA.

FIG. 1 illustrates only components that operate when image data corresponding to a pixel signal acquired from the image sensor 100 is transferred to (written in) the DRAM 300 focusing on components related to acquisition of a pixel signal output from the image sensor 100 among components equipped in the imaging device 10. In other words, the imaging device 10 includes components such as an image-processing unit, a display processing unit, a card IF unit, and a central processing unit (CPU) that controls the imaging device 10 in general in addition to the components illustrated in FIG. 1, similarly to a typical imaging device, but such components are not illustrated in FIG. 1. The image-processing unit performs image processing such as a compression process on image data. The display processing unit performs control for causing image data to be displayed on a display device. The card IF unit performs control for causing image data to be recorded in a recording medium. The components equipped in the imaging device 10 other than the components illustrated in FIG. 1 and operations of the components are similar to those of a typical imaging device. Thus, a detailed description of the components other than the components illustrated in FIG. 1 and the operations of the components will be omitted.

The image sensor 100 is a solid-state imaging device represented by a charge coupled device (CCD) image sensor or a complementary metal-oxide semiconductor (CMOS) image sensor that performs photoelectric conversion on an optical image of a subject formed by a lens (not shown). The image sensor 100 sequentially outputs all pixel signals output from pixels arranged in a region (hereinafter referred to as an "imaging region") for imaging subject light, that is, pixel signals of an overall region for imaging subject light through a plurality of pixels arranged in the form of a two-dimensional (2D) matrix to the image-acquiring unit 210 and the image-acquiring unit 220 for each imaged frame.

Each of the image-acquiring unit 210 and the image-acquiring unit 220 acquires the pixel signals input from the image sensor 100, performs processing such as preprocessing, a resizing process, and a clipping process, transfers processed image data to the DRAM 300, and stores (writes) the image data in the DRAM 300. Each of the image-acquiring unit 210 and the image-acquiring unit 220 transfers (writes) image data obtained by processing the pixel signals output from pixels in a corresponding imaging region of the entire imaging region of the image sensor 100 to the DRAM 300. The image-acquiring unit 210 includes a pixel signal-processing unit 211 and a DMA-IF unit 212. The image-acquiring unit 220 includes a pixel signal-processing unit 221 and a DMA-IF unit 222.

Figure 2:
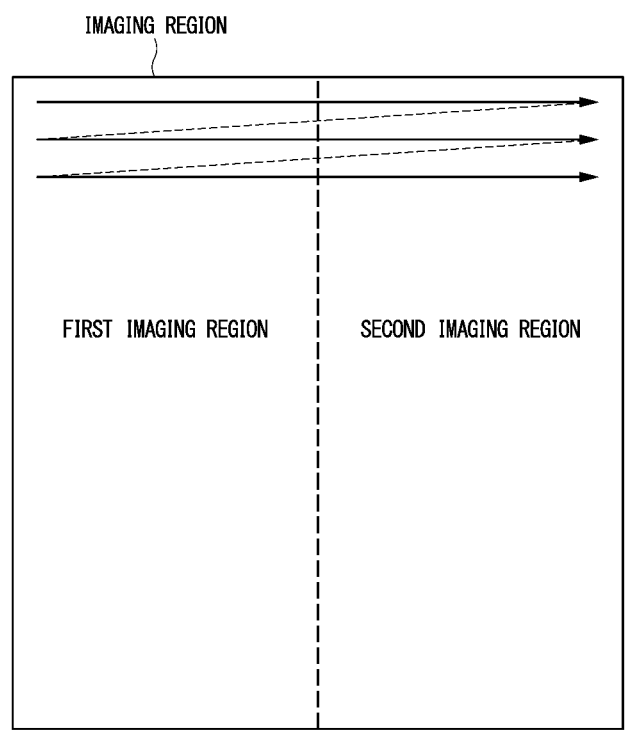
FIG. 2 is a diagram illustrating an example of imaging regions of an image sensor corresponding to image-acquiring units provided in an imaging device according to the present embodiment.

Here, the respective imaging regions corresponding to the image-acquiring unit 210 and the image-acquiring unit 220 will be described. FIG. 2 is a diagram for describing an example of imaging regions of the image sensor 100 corresponding to the image-acquiring units (the image-acquiring unit 210 and the image-acquiring unit 220) equipped in the imaging device 10 according to the present embodiment. Further, FIG. 2 schematically illustrates a sequence in which pixels in the imaging region in the image sensor 100 output pixel signals together.

The imaging device 10 includes two image-acquiring units of the image-acquiring unit 210 and the image-acquiring unit 220. For this reason, in the imaging device 10, the entire imaging region of the imaging device 10 is divided into two adjacent regions, and each of two divisional imaging regions is allocated as a region which is processed by either the image-acquiring unit 210 or the image-acquiring unit 220 as illustrated in FIG. 2.

The following description will proceed in connection with an example in which a first imaging region which is a left region of the two divisional regions is allocated to the pixel signal-processing unit 211, and a second imaging region which is a right region is allocated to the pixel signal-processing unit 221 as illustrated in FIG. 2. Further, when the entire imaging region of the imaging device 10 is divided, the imaging regions may overlap at a position at which the entire imaging region is divided, but for the sake of convenience of description, the respective imaging regions allocated to the image-acquiring unit 210 and the image-acquiring unit 220 are assumed not to overlap.

Each of the pixel signal-processing unit 211 and the pixel signal-processing unit 221 outputs image data obtained by performing preprocessing such as scratch correction, shading correction, and a filter process and processing such as a resizing process and a clipping process on pixel signals of a corresponding imaging region which are input from the image sensor 100 to the DMA-IF unit 212 or the DMA-IF unit 222 corresponding thereto.

More specifically, the pixel signal-processing unit 211 performs processing on pixel signals of the first imaging region input from the image sensor 100, and outputs processed image data to the DMA-IF unit 212 as first image data. The pixel signal-processing unit 221 performs processing on pixel signals of the second imaging region adjacent to the first imaging region processed by the pixel signal-processing unit 211, and outputs processed image data to the DMA-IF unit 222 as second image data.

The DMA-IF unit 212 and the DMA-IF unit 222 output the first image data and the second image data input from the pixel signal-processing unit 211 and the pixel signal-processing unit 221 to the data bus 400 through the DMA, transfer the first image data and the second image data to the DRAM 300, and cause the first image data and the second image data to be stored (written) in the DRAM 300. More specifically, of the DMA-IF unit 212 and the DMA-IF unit 222, the DMA-IF unit 212 transfers (writes) the first image data input from the pixel signal-processing unit 211 to the DRAM 300 via the data bus 400 through the DMA. Further, the DMA-IF unit 222 transfers (writes) the second image data input from the pixel signal-processing unit 211 to the DRAM 300 via the data bus 400 through the DMA. As a result, image data corresponding to the pixel signals of the entire imaging region of the imaging device 10 is transferred to (written in) the DRAM 300.

Further, when the DMA-IF unit 212 and the DMA-IF unit 222 store (write) image data in the DRAM 300, the first image data and the second image data are transferred to and stored (written) in the DRAM 300 so that image data stored in the DRAM 300 has the same arrangement as an image acquired from the image sensor 100. In other words, transfer of the first image data and the second image data to the DRAM 300 is controlled such that a combination of the first image data and the second image data is stored (written) in the DRAM 300 as image data of a frame corresponding to pixel signals of a frame acquired from the image sensor 100.

Further, each of the DMA-IF unit 212 and the DMA-IF unit 222 includes an SRAM as a data buffer. An SRAM has a sufficient capacity to absorb a period of time during which transfer of image data to the DRAM 300 is in a standby state when a DMA access request output when each piece of image data is transferred to the DRAM 300 through the DMA is adjusted. This is similar to a constitution of a general DMA-IF unit. Thus, a detailed description of an operation of a data buffer (SRAM) equipped in each of the DMA-IF unit 212 and the DMA-IF unit 222 will be omitted.

The DRAM 300 stores the first image data and the second image data respectively transferred from the image-acquiring unit 210 and the image-acquiring unit 220 via the data bus 400. Further, the DRAM 300 stores various kinds of data in the processing process of each of the components equipped in the imaging device 10. As described above, the imaging device 10 performs an operation of writing data in the DRAM 300 and an operation of reading data from the DRAM 300 through the DMA. Thus, access requests (DMA access requests) to the DRAM 300 from a plurality of components equipped in the imaging device 10 which are connected to the data bus 400 are adjusted by a DRAM controller (not shown). Further, transfer of data to the DRAM 300 and acquisition of data from the DRAM 300 are controlled by the DRAM controller (not shown).

The above-described imaging device 10 divides the entire imaging region to be imaged by the image sensor 100. Then, in the imaging device 10, the image-acquiring unit 210 and the image-acquiring unit 220 corresponding to the respective divisional imaging regions transfer (write) image data corresponding to pixel signals output from pixels of the respective imaging regions to the DRAM 300.

Figure 3:
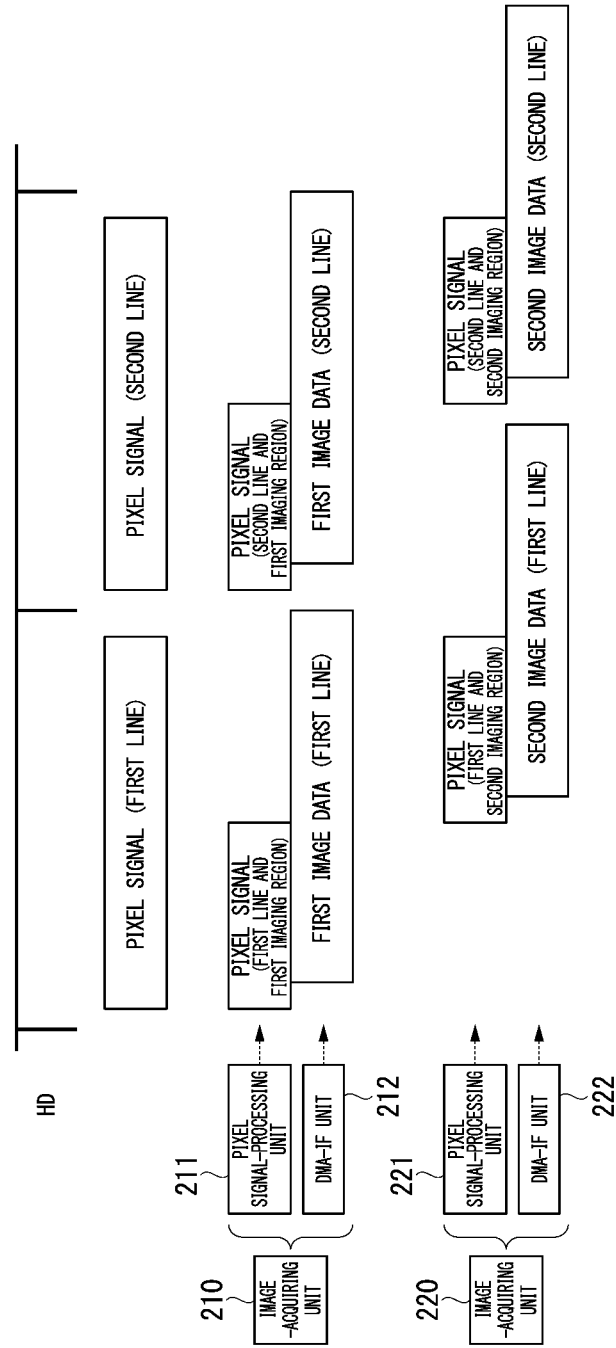
FIG. 3 is a timing chart illustrating an example of a timing at which an image-acquiring unit equipped in an imaging device according to the present embodiment transfers image data acquired from an image sensor.

Next, an operation of transferring (writing) image data corresponding to pixel signals acquired from the image sensor 100 to the DRAM 300 through each of the image-acquiring unit 210 and the image-acquiring unit 220 in the imaging device 10 will be described. FIG. 3 is a timing chart illustrating an example of a timing at which the image-acquiring unit (the image-acquiring unit 210 and the image-acquiring unit 220) equipped in the imaging device 10 according to the present embodiment transfers image data acquired from the image sensor 100.

The image sensor 100 sequentially outputs pixel signals in units of rows (lines) of the imaging region as illustrated in FIG. 2. At this time, the image sensor 100 outputs pixel signals of each line at a timing synchronized with a horizontal synchronous signal HD. FIG. 3 illustrates a timing at which the image sensor 100 outputs pixel signals of the first line and pixel signals of the second line in synchronization with the horizontal synchronous signal HD. Further, pixel signals of other lines of the image sensor 100 are also output at the same timing, subsequently to a timing chart illustrated in FIG. 3.

When the image sensor 100 outputs pixel signals of the first line according to the horizontal synchronous signal HD, the pixel signal-processing unit 211 acquires the pixel signals of the corresponding first imaging region, performs processing on the acquired pixel signals of the first line of the first imaging region, and outputs the first image data of the first line to the DMA-IF unit 212. Then, the DMA-IF unit 212 transfers (writes) the first image data of the first line input from the pixel signal-processing unit 211 to the DRAM 300.

Further, when the image sensor 100 outputs the pixel signals of the first line of the second imaging region, the pixel signal-processing unit 221 acquires the pixel signals of the corresponding second imaging region, performs processing on the acquired pixel signals of the first line of the second imaging region, and outputs the second image data of the first line to the DMA-IF unit 212. Then, the DMA-IF unit 222 transfers (writes) the second image data of the first line input from the pixel signal-processing unit 221 to the DRAM 300.

Then, when the image sensor 100 outputs the pixel signals of the second line according to the horizontal synchronous signal HD, similarly, the pixel signal-processing unit 211 acquires the pixel signals of the corresponding first imaging region, and outputs the first image data of the second line obtained by processing the pixel signals of the second line of the first imaging region to the DMA-IF unit 212. Then, the DMA-IF unit 212 similarly transfers (writes) the first image data of the second line input from the pixel signal-processing unit 211 to the DRAM 300.

Further, when the image sensor 100 outputs the pixel signals of the second line of the second imaging region, similarly, the pixel signal-processing unit 221 acquires the pixel signals of the corresponding second imaging region, performs processing on the acquired pixel signals of the second line of the second imaging region, and outputs the second image data of the second line to the DMA-IF unit 212. Then, the DMA-IF unit 222 similarly transfers (writes) the second image data of the second line input from the pixel signal-processing unit 221 to the DRAM 300.

As described above, in the imaging device 10, the pixel signal-processing unit 211 and the pixel signal-processing unit 221 acquire the pixel signals of the corresponding first imaging region and the pixel signals of the corresponding second imaging region from the image sensor 100, respectively. Then, the pixel signal-processing unit 211 and the pixel signal-processing unit 221 output the processed first image data and the processed second image data to the DMA-IF unit 212 and the DMA-IF unit 222, respectively. Then, the DMA-IF unit 212 and the DMA-IF unit 222 transfer (write) the first image data and the second image data input from the pixel signal-processing unit 211 and the pixel signal-processing unit 221 to the DRAM 300, respectively.

At this time, as can be seen from FIG. 3, each of the pixel signal-processing unit 211 and the pixel signal-processing unit 221 may acquire pixel signals output from the image sensor 100 by half the amount of pixel signals acquired by the imaging device of the related art. Then, the DMA-IF unit 212 and the DMA-IF unit 222 preferably transfer (write) the first image data and the second image data input from the pixel signal-processing unit 211 and the pixel signal-processing unit 221 to the DRAM 300 until first image data and second image data of a next line are input from the pixel signal-processing unit 211 and the pixel signal-processing unit 221, respectively. More specifically, it is preferable that the DMA-IF unit 212 and the DMA-IF unit 222 completely transfer (write) the first image data and the second image data, which are half those in the imaging device of the related art, input from the pixel signal-processing unit 211 and the pixel signal-processing unit 221 to the DRAM 300 during a period of time (a period of time corresponding to one line) of one period of the horizontal synchronous signal HD. This means that it is preferable that each of the DMA-IF unit 212 and the DMA-IF unit 222 complete transfer of image data to the DRAM 300 during a period of time which is twice as long as that in the imaging device of the related art.

Thus, for example, even when transfer of data to the DRAM 300 enters a standby state by the access request (the DMA access request) from another component equipped in the imaging device 10, each of the DMA-IF unit 212 and the DMA-IF unit 222 can complete transfer of image data with ample time to spare. As a result, since the quality of an image imaged by the imaging device 10 is improved, even when many pixel signals are output from the image sensor 100, high-resolution image data corresponding to pixel signals output from the image sensor 100 can be transferred (written) to the DRAM 300 at a high frame rate in the state in which congestion of the data bus 400 is suppressed.

Figure 4:
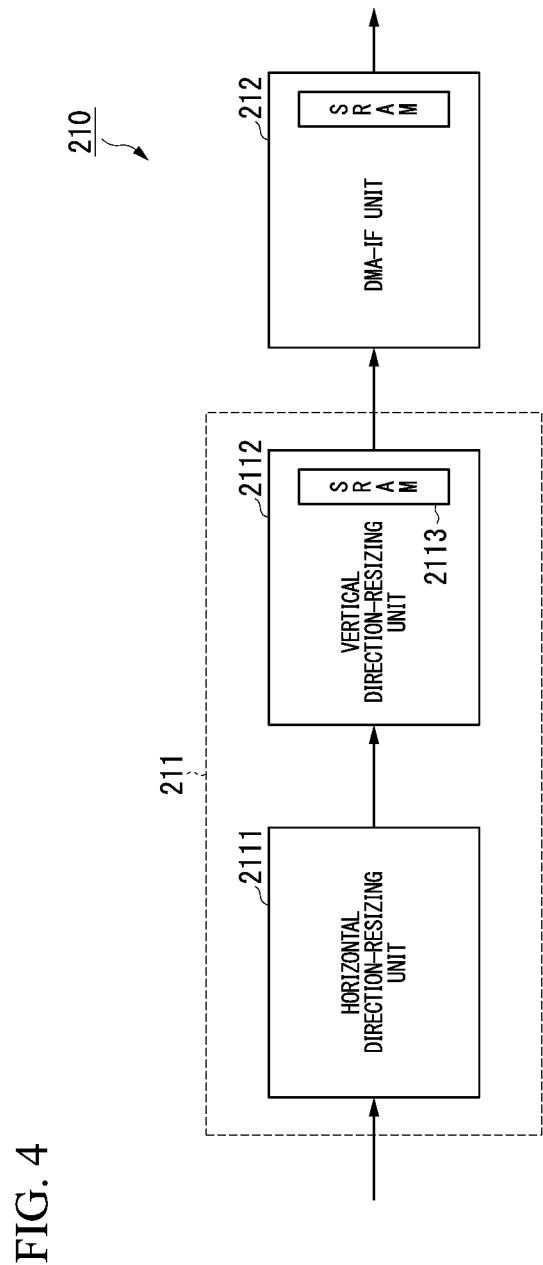
FIG. 4 is a block diagram illustrating a schematic constitution by which an image-acquiring unit equipped in an imaging device according to the present embodiment performs a resizing process.

Next, operations of the image-acquiring unit 210 and the image-acquiring unit 220 equipped in the imaging device 10 will be described. FIG. 4 is a block diagram illustrating a schematic constitution by which the image-acquiring unit (the image-acquiring unit 210 and the image-acquiring unit 220) equipped in the imaging device 10 according to the present embodiment performs a resizing process. The image-acquiring unit 210 illustrated in FIG. 4 includes the pixel signal-processing unit 211 and the DMA-IF unit 212 as illustrated in FIG. 1. The pixel signal-processing unit 211 of the image-acquiring unit 210 includes a horizontal direction-resizing unit 2111 and a vertical direction-resizing unit 2112. The image-acquiring unit 210 illustrated in FIG. 4 corresponds to a constitution of an image-acquiring unit for performing the resizing process which is generally performed in an imaging device. In the present embodiment, the imaging device 10 includes the two image-acquiring units 210 and 220 having the same constitution, and only the image-acquiring unit 210 is illustrated in FIG. 4.

The horizontal direction-resizing unit 2111 performs the resizing process in the horizontal direction using pixel signals output from a predetermined number of pixels arranged in the horizontal direction (the row direction) in the corresponding first imaging region or the corresponding second imaging region in the imaging region of the image sensor 100.

The vertical direction-resizing unit 2112 performs the resizing process in the vertical direction using pixel signals output from a predetermined number of pixels arranged in the vertical direction (the column direction) in the corresponding first imaging region or the corresponding second imaging region in the imaging region of the image sensor 100.

Figure 5:
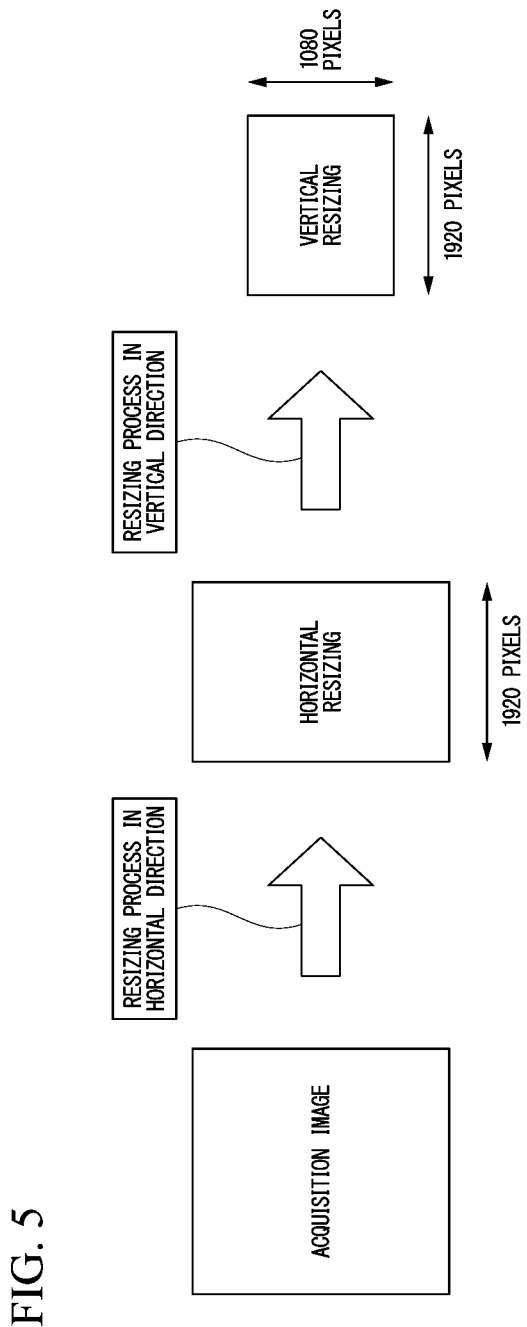
FIG. 5 is a diagram illustrating an example of a resizing process operation in an image-acquiring unit equipped in an imaging device according to the present embodiment.

In the resizing process performed by the image-acquiring unit 210, the resizing process is performed on pixel signals (hereinafter referred to as an "acquisition image") acquired from the entire imaging region of the imaging device 10 such that the resizing process is first performed in the horizontal direction, and the resizing process is then performed in the vertical direction as illustrated in FIG. 5. FIG. 5 illustrates an example in which the image-acquiring unit 210 performs the resizing process of resizing the acquisition image to the size of 1920 pixels in the horizontal direction and then performs the resizing process of resizing the acquisition image to the size of 1080 pixels in the vertical direction.

In the resizing process performed by the image-acquiring unit 210, that is, the resizing process in the horizontal direction-resizing unit 2111 and the vertical direction-resizing unit 2112, a value of a pixel signal which has been subjected to the resizing process is obtained, for example, by multiplying each of pixel signals output from a predetermined number of adjacent pixels by a predetermined coefficient. At this time, the horizontal direction-resizing unit 2111 can perform the resizing process using the pixel signals sequentially output from the image sensor 100. However, in the vertical direction-resizing unit 2112, since the image sensor 100 outputs the pixel signals in units of rows (lines) of the imaging region, pixel signals which are output from adjacent pixels in the vertical direction and used in the resizing process are included in different lines. For this reason, the vertical direction-resizing unit 2112 needs to temporarily hold all pixel signals of each line used in the resizing process by the number of pixels adjacent in the vertical direction. To this end, the vertical direction-resizing unit 2112 includes an SRAM 2113 having a sufficient capacity to temporarily hold pixel signals of a plurality of lines used in the resizing process as a line buffer.

In the following description, the SRAM 2113 is also referred to as a "line buffer 2113."

For example, the image sensor 100 is assumed to be a solid-state imaging device in which color filters of the Bayer array are disposed on an imaging plane, and in the resizing process performed by the image-acquiring unit 210, the resizing process in the vertical direction is assumed to be performed using pixel signals output from 4 adjacent pixels of the same color.

In the image sensor 100 with the Bayer array, for example, pixel signals of a red (R) pixel and a blue (B) pixel are output in every other line. For this reason, in order to perform the resizing process in the vertical direction using pixel signals output from 4 pixels adjacent in the vertical direction, the vertical direction-resizing unit 2112 includes the line buffer 2113 that temporarily holds pixel signals corresponding to 7 lines.

Figure 6:
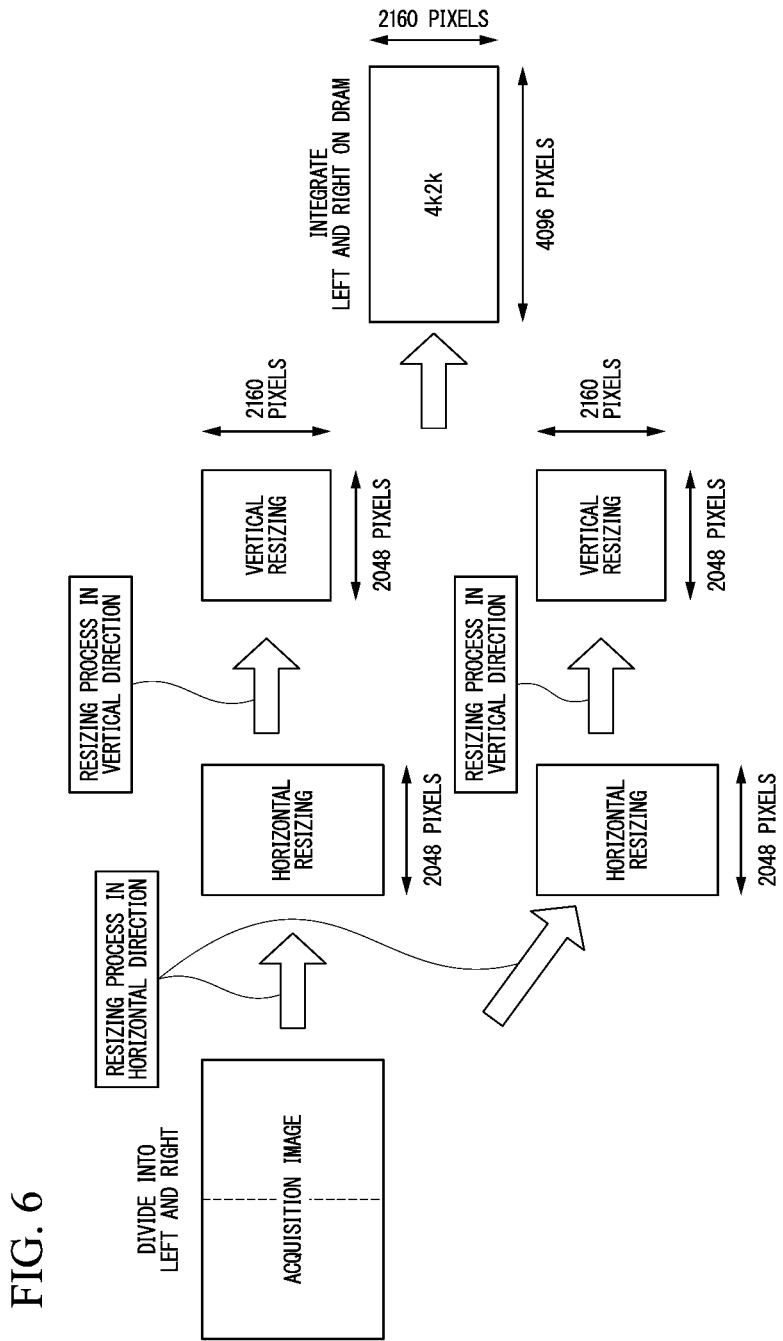
FIG. 6 is a diagram illustrating an example of an operation in which an image-acquiring unit equipped in an imaging device according to the present embodiment performs a resizing process on a high-resolution image.

Here, the resizing process performed by the image-acquiring unit 210 and the image-acquiring unit 220 when the imaging device 10 includes the high-resolution image sensor 100 will be described. FIG. 6 is a diagram for describing an example of an operation in which the image-acquiring unit (the image-acquiring unit 210 and the image-acquiring unit 220) equipped in the imaging device 10 according to the present embodiment performs the resizing process on a high-resolution image. FIG. 6 illustrates an example of an operation of generating a moving image with the resolution (4096 pixels×2160 pixels) of the 4K2K size which is larger than a moving image with the resolution (1920 pixels×1080 pixels) of a 1080P format which is mainstream in current moving image shooting and needs to be subjected to additional processing later.

As described above, in the imaging device 10, the image-acquiring unit 210 and the image-acquiring unit 220 transfer (write) the image data (the first image data and the second image data) obtained by processing the pixel signals of the two divisional imaging regions (the first imaging region and the second imaging region) to the DRAM 300. Thus, the image-acquiring unit 210 and the image-acquiring unit 220 perform the same resizing process on the two left and right acquisition images divided from the acquisition image acquired from the image sensor 100 as illustrated in FIG. 6.

More specifically, the horizontal direction-resizing unit 2111 of the image-acquiring unit 210 first performs the resizing process of resizing one image (for example, the left region) of the two divisional acquisition images to the size of 2048 pixels in the horizontal direction, the vertical direction-resizing unit 2112 of the image-acquiring unit 210 performs the resizing process of resizing one image to the size of 2160 pixels in the vertical direction, and the DMA-IF unit 212 of the image-acquiring unit 210 transfers (writes) image data which has been subjected to the resizing process to the DRAM 300. Further, the horizontal direction-resizing unit 2111 of the image-acquiring unit 220 first performs the resizing process of resizing the other image (for example, the right region) of the two divisional acquisition images to the size of 2048 pixels in the horizontal direction, the vertical direction-resizing unit 2112 of the image-acquiring unit 220 performs the resizing process of resizing the other image to the size of 2160 pixels in the vertical direction, and the DMA-IF unit 212 of the image-acquiring unit 220 transfers (writes) image data which has been subjected to the resizing process to the DRAM 300. As a result, the image data stored (written) in the DRAM 300 is converted into image data having the size in which 4096 pixels are arranged in the horizontal direction and 2160 pixels are arranged in the vertical direction as illustrated in FIG. 6.

Figure 7:
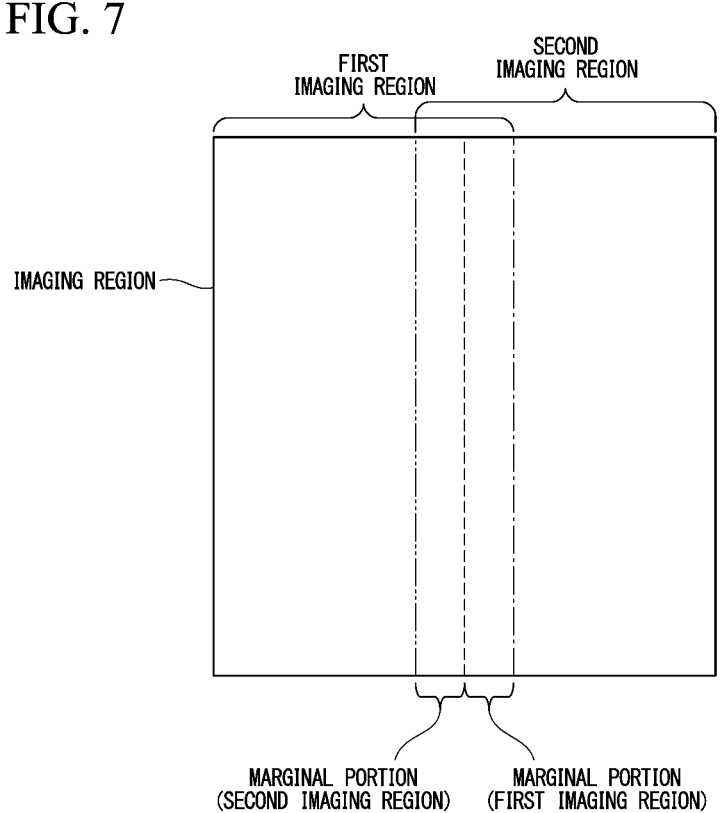
FIG. 7 is a diagram illustrating an example of an imaging region of an image sensor corresponding to an image-acquiring unit equipped in an imaging device according to the present embodiment.

Further, when each of the image-acquiring unit 210 and the image-acquiring unit 220 performs the resizing process, another process such as a filter process is performed as well. For this reason, when the acquisition image is divided into two in the region processed by each of the image-acquiring unit 210 and the image-acquiring unit 220, the first imaging region and the second imaging region are allocated to the pixel signal-processing unit 211 and the pixel signal-processing unit 221, respectively, so that each of the acquisition images of the divisional regions has a portion in which pixel signals overlap, a so-called "marginal portion" as illustrated in FIG. 7. Further, the amount of pixel signals included in the marginal portion in each of the first imaging region and the second imaging region is decided according to the number of taps necessary for a filter used in the filter process in the resizing process. This is because it is necessary to additionally process as many pixel signals as the number of taps of a filter in the filter process in order to cause an angle of view of an image which has been subjected to the resizing process to be identical to an angle of view of an image which has not subjected to the resizing process.

As described above, in the imaging device 10, the acquisition image acquired from the image sensor 100 is divided, and the image-acquiring unit 210 and the image-acquiring unit 220 perform the same process on the respective divided acquisition images. As a result, a processing load in each image-acquiring unit can be prevented from increasing to be more than necessary, and image data obtained by performing processing on the high-resolution acquisition image can be transferred (written) to the DRAM 300.

Further, as described above, in the imaging device 10, each of the DMA-IF unit 212 of the image-acquiring unit 210 and the DMA-IF unit 222 of the image-acquiring unit 220 can use a period of time which is twice as long as that in the imaging device of the related art in transferring (writing) image data to the DRAM 300. Thus, the image-acquiring unit 210 and the image-acquiring unit 220 can adjust a timing for transferring (writing) image data obtained as a result of processing the pixel signals input from the image sensor 100 to the DRAM 300.

Figure 8:
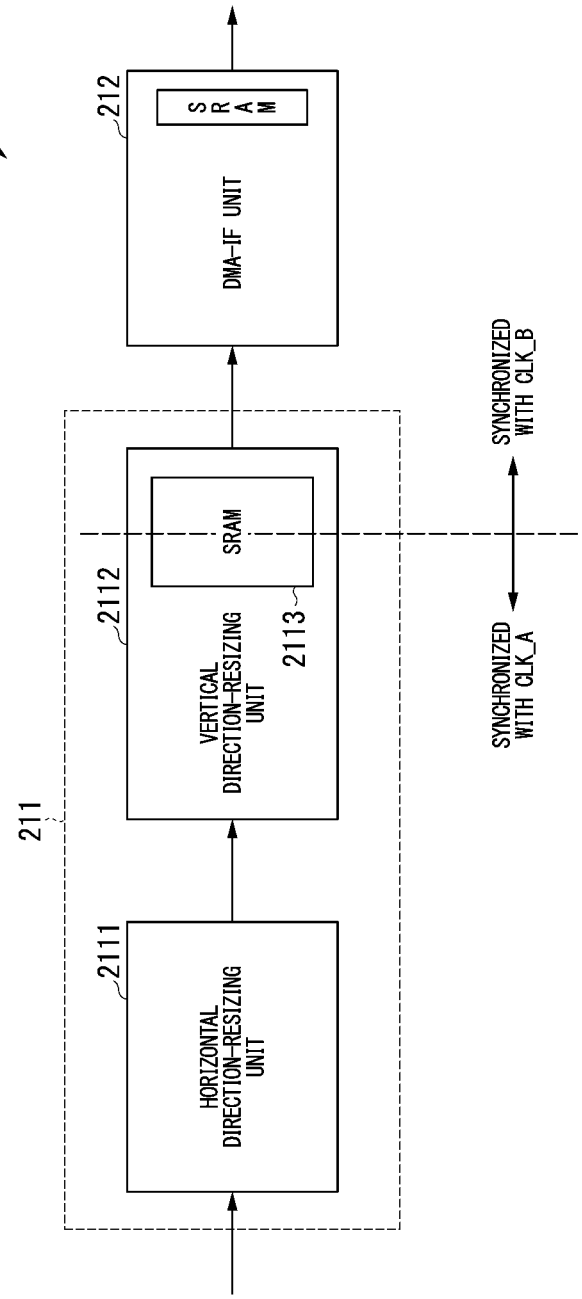
FIG. 8 is a block diagram illustrating a schematic constitution by which an image-acquiring unit equipped in an imaging device according to the present embodiment adjusts a timing for transferring image data.

Next, an operation of adjusting a timing at which each of the image-acquiring unit 210 and the image-acquiring unit 220 equipped in the imaging device 10 transfers (writes) image data to the DRAM 300 will be described. FIG. 8 is a block diagram illustrating a schematic constitution by which the image-acquiring unit (the image-acquiring unit 210 and the image-acquiring unit 220) equipped in the imaging device 10 according to the present embodiment adjusts a timing for transferring image data. The image-acquiring unit 210 illustrated in FIG. 8 includes the pixel signal-processing unit 211 and the DMA-IF unit 212 as illustrated in FIG. 1. Further, the pixel signal-processing unit 211 of the image-acquiring unit 210 includes the horizontal direction-resizing unit 2111 and the vertical direction-resizing unit 2112 as illustrated in FIG. 4. The image-acquiring unit 210 illustrated in FIG. 8 corresponds to a constitution of an image-acquiring unit when a timing for transferring (writing) image data to the DRAM 300 is adjusted using the SRAM 2113 (the line buffer 2113) equipped in the vertical direction-resizing unit 2112. In the present embodiment, although the imaging device 10 includes the two image-acquiring units 210 and 220 having the same constitution, only the image-acquiring unit 210 is illustrated in FIG. 8.

In timing adjustment by the image-acquiring unit 210, a timing at which image data obtained by performing the resizing process through the image-acquiring unit 210 is output to the DMA-IF unit 212 is adjusted by changing a write speed of writing image data which has been obtained by performing the resizing process in the horizontal direction through the horizontal direction-resizing unit 2111 and input to the vertical direction-resizing unit 2112 to the line buffer 2113 and a read speed of reading image data held in the line buffer 2113 to perform the resizing process in the vertical direction.

FIG. 8 schematically illustrates a position at which a timing of a clock signal CLK_A, with which image data obtained by performing the resizing process in the horizontal direction through the horizontal direction-resizing unit 2111 is written in the line buffer 2113 in synchronization, is switched to a timing of a clock signal CLK_B, with which image data held in the line buffer 2113 is read in synchronization, and which is later than the clock signal CLK_A, that is, a clock-switching position. For example, the clock signal CLK_A corresponds to a clock signal by which the image sensor 100 outputs a pixel signal. Further, the clock signal CLK_B may be any clock signal such as a clock signal by which a period of the clock signal CLK_A is changed or a clock signal by which a waveform of the clock signal CLK_A partially becomes toothless, as long as a clock signal is used to change a speed at which the vertical direction-resizing unit 2112 reads image data held in the line buffer 2113. Here, a period of the clock signal CLK_B needs to be less than twice a period of the clock signal CLK_A. This is because, in the present embodiment, a period of time which the DMA-IF unit 212 of the image-acquiring unit 210 can use to transfer (write) image data to the DRAM 300 is twice as long as a period of time in the imaging device of the related art.

The above description has been made in connection with the example in which, when the image-acquiring unit 210 performs the resizing process on the pixel signals input from the image sensor 100, clock switching is performed using the line buffer 2113 equipped in the vertical direction-resizing unit 2112, but clock switching may be performed without performing the resizing process. In this case, a buffer unit used for clock switching may be the line buffer 2113 equipped in the vertical direction-resizing unit 2112 or may be a buffer equipped in a component that is disposed in the pixel signal-processing unit 211 and performs a preprocess such as scratch correction, shading correction, and a filter process, a clipping process, or any other processing.

Figure 9:
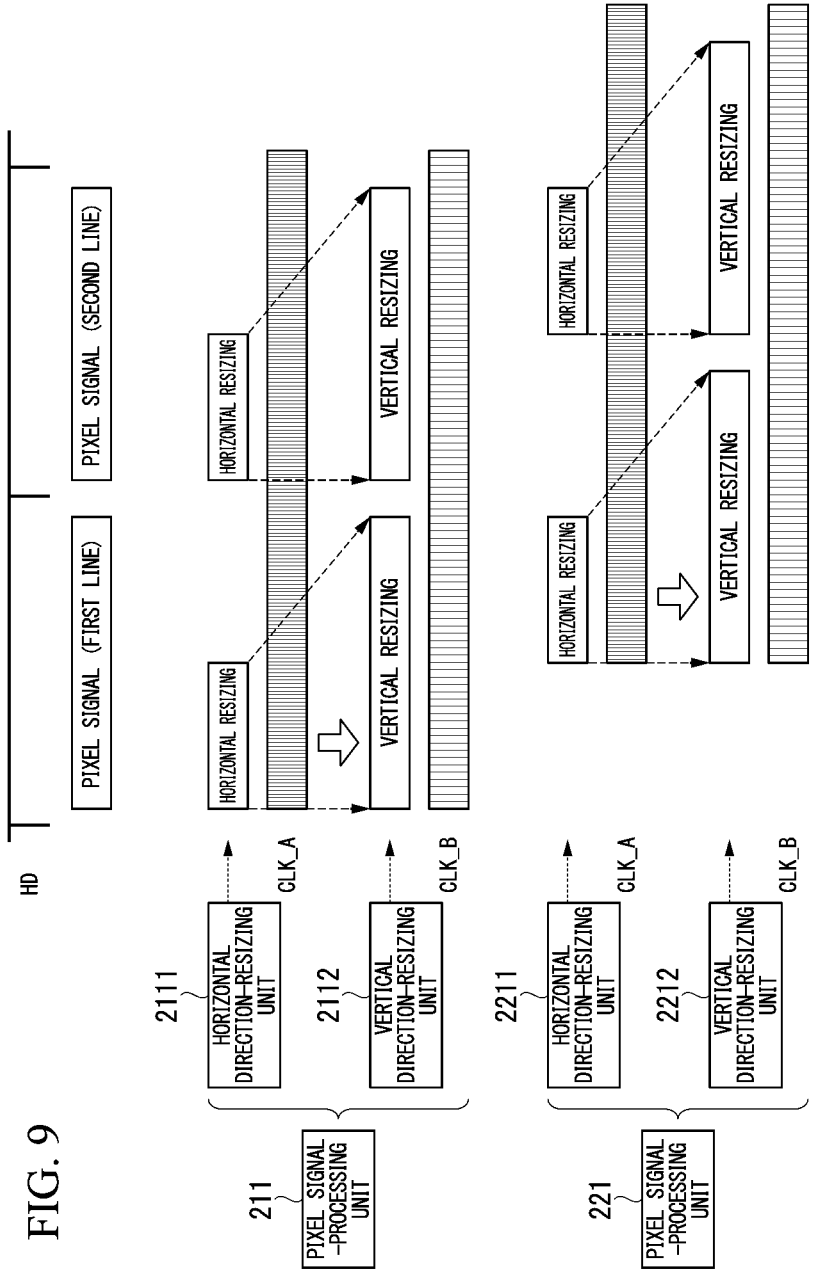
FIG. 9 is a timing chart illustrating an example in which an image-acquiring unit equipped in an imaging device according to the present embodiment adjusts a timing for transferring image data.

Here, clock switching performed by each of the image-acquiring unit 210 and the image-acquiring unit 220 in the imaging device 10 will be described. FIG. 9 is a timing chart illustrating an example in which the image-acquiring unit (the image-acquiring unit 210 and the image-acquiring unit 220) equipped in the imaging device 10 according to the present embodiment adjusts a timing for transferring image data. In the following description, the horizontal direction-resizing unit 2111 equipped in the pixel signal-processing unit 221 of the image-acquiring unit 220 is referred to as a horizontal direction-resizing unit 2211, and the vertical direction-resizing unit 2112 is referred to as a vertical direction-resizing unit 2212. Further, an SRAM (line buffer) equipped in the vertical direction-resizing unit 2212 is referred to as a line buffer 2213.

The image sensor 100 sequentially outputs the pixel signals in units of rows (lines) of the imaging region at a timing synchronized with the horizontal synchronous signal HD as described above. FIG. 9 illustrates a timing at which the image sensor 100 outputs the pixel signals of the first line and the pixel signals of the second line in synchronization with the horizontal synchronous signal HD. Further, pixel signals of other lines of the image sensor 100 are output at the same timing, subsequently to a timing chart illustrated in FIG. 9.

When the image sensor 100 outputs the pixel signals of the first line according to the horizontal synchronous signal HD, the pixel signal-processing unit 211 of the image-acquiring unit 210 acquires the pixel signals of the corresponding first imaging region at a timing synchronized with the clock signal CLK_A, and the horizontal direction-resizing unit 2111 outputs image data obtained by performing the resizing process in the horizontal direction on the acquired pixel signals of the first line of the first imaging region to the vertical direction-resizing unit 2112. Then, the vertical direction-resizing unit 2112 writes image data obtained by performing the resizing process in the horizontal direction through the horizontal direction-resizing unit 2111 in the line buffer 2113 at a timing synchronized with the clock signal CLK_A, and outputs the first image data of the first line obtained by performing the resizing process in the vertical direction to the DMA-IF unit 212 at a timing synchronized with the clock signal CLK_B. Then, the DMA-IF unit 212 transfers (writes) the first image data of the first line input from the vertical direction-resizing unit 2112 to the DRAM 300.

Further, when the image sensor 100 outputs the pixel signals of the first line of the second imaging region, the pixel signal-processing unit 221 of the image-acquiring unit 220 acquires the pixel signals of the corresponding second imaging region at a timing synchronized with the clock signal CLK_A, and the horizontal direction-resizing unit 2211 outputs image data obtained by performing the resizing process in the horizontal direction on the acquired pixel signals of the first line of the second imaging region to the vertical direction-resizing unit 2212. Then, the vertical direction-resizing unit 2212 writes image data obtained by performing the resizing process in the horizontal direction through the horizontal direction-resizing unit 2211 in the line buffer 2213 at a timing synchronized with the clock signal CLK_A, and outputs the second image data of the first line obtained by performing the resizing process in the vertical direction to the DMA-IF unit 222 at a timing synchronized with the clock signal CLK_B. Then, the DMA-IF unit 222 transfers (writes) the second image data of the first line input from the vertical direction-resizing unit 2212 to the DRAM 300.

Thereafter, when the image sensor 100 outputs the pixel signals of the second line according to the horizontal synchronous signal HD, similarly, the pixel signal-processing unit 211 of the image-acquiring unit 210 acquires the pixel signals of the corresponding first imaging region at a timing synchronized with the clock signal CLK_A, and the horizontal direction-resizing unit 2111 outputs image data obtained by performing the resizing process in the horizontal direction on the acquired pixel signals of the second line of the first imaging region to the vertical direction-resizing unit 2112. Then, similarly, the vertical direction-resizing unit 2112 writes image data obtained by performing the resizing process in the horizontal direction through the horizontal direction-resizing unit 2111 in the line buffer 2113 at a timing synchronized with the clock signal CLK_A, and outputs the first image data of the second line obtained by performing the resizing process in the vertical direction to the DMA-IF unit 212 at a timing synchronized with the clock signal CLK_B. Then, similarly, the DMA-IF unit 212 transfers (writes) the first image data of the second line input from the vertical direction-resizing unit 2112 to the DRAM 300.

Further, when the image sensor 100 outputs the pixel signals of the second line of the second imaging region, similarly, the pixel signal-processing unit 221 of the image-acquiring unit 220 acquires the pixel signals of the corresponding second imaging region at a timing synchronized with the clock signal CLK_A, and the horizontal direction-resizing unit 2211 outputs image data obtained by performing the resizing process in the horizontal direction on the acquired pixel signals of the second line of the second imaging region to the vertical direction-resizing unit 2212. Then, similarly, the vertical direction-resizing unit 2212 writes image data obtained by performing the resizing process in the horizontal direction through the horizontal direction-resizing unit 2211 in the line buffer 2213 at a timing synchronized with the clock signal CLK_A, and outputs the second image data of the second line obtained by performing the resizing process in the vertical direction to the DMA-IF unit 222 at a timing synchronized with the clock signal CLK_B. Then, similarly, the DMA-IF unit 222 transfers (writes) the second image data of the second line input from the vertical direction-resizing unit 2212 to the DRAM 300.

As described above, in the imaging device 10, the pixel signal-processing unit 211 and the pixel signal-processing unit 221 acquire the pixel signals of the corresponding first imaging region and the pixel signals of the corresponding second imaging region from the image sensor 100 in synchronization with the clock signal CLK_A, and output the first image data and the second image data which have been subjected to the resizing process to the DMA-IF unit 212 and the DMA-IF unit 222, respectively, at a timing synchronized with the clock signal CLK_B. Then, the DMA-IF unit 212 and the DMA-IF unit 222 transfer (write) the first image data and the second image data input from the pixel signal-processing unit 211 and the pixel signal-processing unit 221 to the DRAM 300, respectively.

As a result, in the imaging device 10, a timing at which image data obtained by performing the resizing process on the pixel signals input from the image sensor 100 is transferred (written) to the DRAM 300 can be adjusted from a timing synchronized with the clock signal CLK_A to a timing synchronized with the clock signal CLK_B. Thus, in the imaging device 10, image data obtained by processing the high-resolution acquisition image can be transferred (written) to the DRAM 300 in the state in which congestion of the data bus 400 is suppressed. Further, in the imaging device 10, some components, that is, a circuit subsequent to the line buffer 2113 equipped in the vertical direction-resizing unit 2112 and a circuit subsequent to the line buffer 2213 equipped in the vertical direction-resizing unit 2212, operate at a timing synchronized with the clock signal CLK_B later than the clock signal CLK_A, and thus power consumption of the imaging device 10 can be reduced.

Here, operations of the image-acquiring unit 210 and the image-acquiring unit 220 in the imaging device 10 will be described. FIGS. 10A to 10D are diagrams for describing an example of image data output from the image-acquiring unit (the image-acquiring unit 210 and the image-acquiring unit 220) equipped in the imaging device 10 according to the present embodiment. FIGS. 10A to 10D illustrate only the image sensor 100 and the image-acquiring unit 210 and the image-acquiring unit 220 that acquire the pixel signals output from the image sensor 100.

Figure 10A:
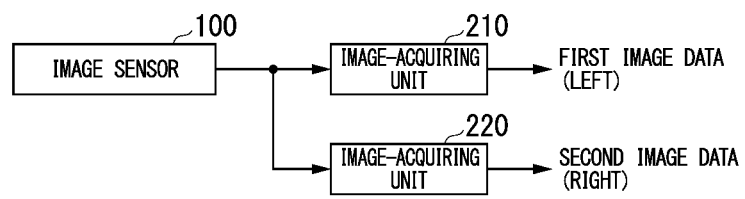
FIG. 10A is a diagram illustrating an example of image data output from an image-acquiring unit equipped in an imaging device 10 according to the present embodiment.

In the imaging device 10, as the entire imaging region of the imaging device 10 is divided into two left and right regions, the image-acquiring unit 210 can acquire the pixel signals of the first imaging region at the left side, the image-acquiring unit 220 can acquire the pixel signals of the second imaging region at the right side, and image data (the first image data and the second image data) corresponding to the acquired pixel signals can be transferred (written) to the DRAM 300 as illustrated in FIG. 10A.

Figure 10B:
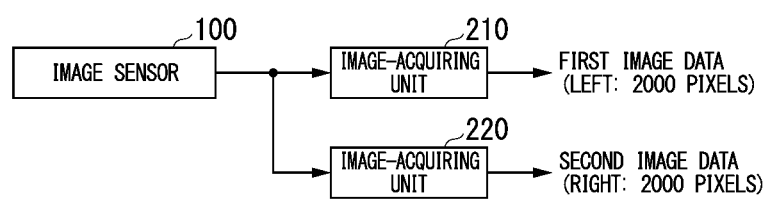
FIG. 10B is a diagram illustrating an example of image data output from an image-acquiring unit equipped in an imaging device 10 according to the present embodiment.

Further, in the imaging device 10, even when the image sensor 100 outputs high-resolution pixel signals at a high frame rate, the image-acquiring unit 210 and the image-acquiring unit 220 can respectively acquire the pixel signals of the two left and right imaging regions divided from the entire imaging region of the imaging device 10, and thus image data according to the high-resolution pixel signals can be transferred (written) to the DRAM 300. FIG. 10B illustrates an example in which the image-acquiring unit 210 transfers (writes) the first image data of 2000 pixels in the left divisional region to the DRAM 300, and the image-acquiring unit 220 transfers (writes) the second image data of 2000 pixels in the right divisional region to the DRAM 300. Thus, image data with the size of 4000 pixels is stored (written) in the DRAM 300.

Figure 10C:
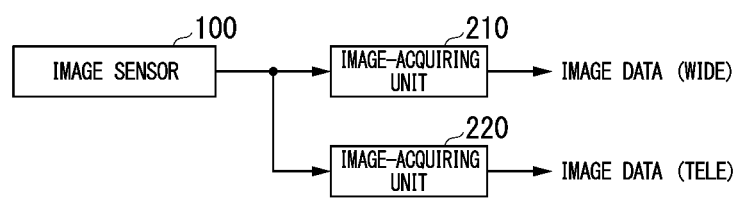
FIG. 10C is a diagram illustrating an example of image data output from an image-acquiring unit equipped in an imaging device 10 according to the present embodiment.

Further, in the imaging device 10, a function of the imaging device of the related art can be implemented by controlling operations of the image-acquiring unit 210 and the image-acquiring unit 220. For example, when the imaging device 10 simultaneously shoots a wide-angle (wide) moving image and a telescopic (tele) moving image similarly to the imaging device of the related art, the image-acquiring unit 210 can acquire pixel signals of an imaging region at a wide-angle (wide) side, the image-acquiring unit 220 can acquire pixel signals of an imaging region at a telescopic (tele) side, and image data (wide-angle side image data and telescopic side image data) corresponding to the acquired pixel signals can be transferred (written) to the DRAM 300 as illustrated in FIG. 10C.

Further, in the imaging device 10, when a degree of congestion of the data bus 400 is low and a single image-acquiring unit is capable of performing acquisition of pixel signals and transfer of image data, either of the image-acquiring unit 210 and the image-acquiring unit 220 may be stopped.

Figure 10D:
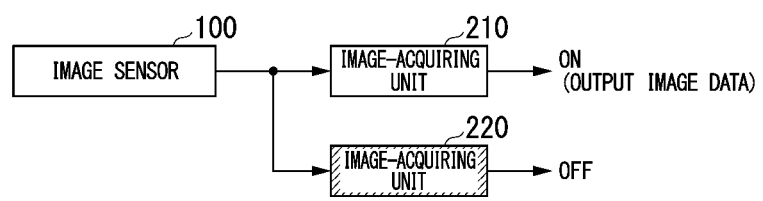
FIG. 10D is a diagram illustrating an example of image data output from an image-acquiring unit equipped in an imaging device 10 according to the present embodiment.

FIG. 10D illustrates an example in which an operation of the image-acquiring unit 220 is stopped (OFF), and the image-acquiring unit 210 performs acquisition of pixel signals output from the image sensor 100 and transfer of image data. In this case, in the imaging device 10, as one of the image-acquiring units is stopped, power consumption can be reduced.

As described above, according to the embodiment of the present invention, the entire imaging region in which the solid-state imaging device performs imaging is divided, and each of a plurality of image-acquiring units provided in the imaging device acquires pixel signals of a corresponding divisional imaging region. Further, according to the embodiment of the present invention, each of the plurality of image-acquiring units transfers (writes) image data corresponding to the pixel signals of a corresponding imaging region to the DRAM. Thus, each image-acquiring unit may acquire pixel signals output from the solid-state imaging device by half the amount of pixel signals acquired by the imaging device of the related art. Further, each image-acquiring unit only has to transfer (write) image data to the DRAM until the next pixel signals of the corresponding imaging region are input from the solid-state imaging device, and thus can use twice as much time as that in the imaging device of the related art in transferring (writing) image data to the DRAM. Thus, in the embodiment of the present invention, each image-acquiring unit can complete acquisition of pixel signals and transfer of image data with ample time to spare, and even when the solid-state imaging device equipped in the imaging device outputs a large amount of pixel signals, image data corresponding to high-resolution pixel signals output from the solid-state imaging device can be transferred (written) to the DRAM at a high frame rate in the state in which congestion of the data bus in the imaging device is suppressed.

Further, in the embodiment of the present invention, since each image-acquiring unit can complete acquisition of pixel signals and transfer of image data with ample time to spare, it is possible to adjust a timing at which image data obtained as a result of processing pixel signals input from the solid-state imaging device is transferred (written) to the DRAM, that is, it is possible to perform clock switching. Thus, in the embodiment of the present invention, processing loads of some components equipped in the imaging device can be suppressed in the state in which congestion of the data bus in the imaging device is suppressed, and power consumption of the imaging device can be reduced. As a result, it is possible to develop and provide an imaging device having a high commercial value.

The present embodiment has been described in connection with the example in which the imaging device 10 includes the two image-acquiring units 210 and 220, the entire imaging region of the imaging device 10 is divided into two, the image-acquiring unit 210 and the image-acquiring unit 220 acquire the pixel signals of the corresponding first imaging region and the pixel signals of the second imaging region, respectively, and transfer (write) image data which have been subjected to the same processing to the DRAM 300. However, the number of image-acquiring units provided in the imaging device and the number of divisional imaging regions of the image sensor 100 are not limited to the examples described in the embodiment of the present invention. For example, the imaging device 10 may include four image-acquiring units, the entire imaging region of the imaging device 10 is divided into four which is equal in number to the number of image-acquiring units provided in the imaging device, and each image-acquiring unit acquires the pixel signals of a corresponding imaging region, and transfers (writes) image data which has been subjected to the same processing to the DRAM 300. In this case, each image-acquiring unit may acquire pixel signals output from the image sensor 100 by one fourth (¼) the amount of pixel signals acquired by the imaging device of the related art, and the DMA-IF unit of each image-acquiring unit may transfer (write) image data input from the pixel signal-processing unit of each image-acquiring unit to the DRAM 300 until image data of a next line is input from the pixel signal-processing unit. Thus, the DMA-IF unit of each image-acquiring unit only has to completely transfer (write) one fourth (¼) of the image data input from the pixel signal-processing unit to the DRAM 300 within a period of time, which is four times as long as that in the imaging device of the related art, or within a period of time of four times, which is equal to the number of image-acquiring units provided in the imaging device, and thus transfer of image data can be completed with ample time to spare.

Further, the present embodiment has been described in connection with the constitution in which the image-acquiring unit 210 and the image-acquiring unit 220 perform the resizing process. However, the resizing process in the image-acquiring unit 210 and the image-acquiring unit 220 is an example of processing performed by the image-acquiring unit 210 and the image-acquiring unit 220 equipped in the imaging device 10. Further, a method of performing the resizing process through the image-acquiring unit 210 and the image-acquiring unit 220 is not limited to the method described in the embodiment of the present invention. Thus, the technical spirit of the present invention can be similarly applied when the image-acquiring unit 210 and the image-acquiring unit 220 perform any processing within the scope not departing from the gist of the present invention in addition to the preprocessing such as scratch correction, shading correction, or a filter process, or a clipping process described in the present embodiment.

Further, the present embodiment has been described in connection with an example in which clock switching is performed using the line buffer 2113 equipped in the vertical direction-resizing unit 2112, and thus switching to a clock with which a circuit subsequent to the line buffer equipped in the vertical direction-resizing unit 2112 is synchronized is performed. However, in the image-acquiring unit 210 and the image-acquiring unit 220, a position at which clock switching is performed is an example, and the technical spirit of the present invention can be similarly applied when any position in the image-acquiring unit 210 and the image-acquiring unit 220 within the scope not departing from the gist of the present invention is used according to a component that performs processing in the image-acquiring unit 210 and the image-acquiring unit 220.

Further, even when the horizontal direction and the vertical direction are reversed in the present embodiment, the technical spirit of the present invention can be similarly applied.

The exemplary embodiment of the present invention has been described above with reference to the appended drawings, but a concrete constitution is not limited to the above example, and various changes can be made within the scope not departing from the gist of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device, comprising:
a solid-state imaging device that includes a plurality of pixels arranged in a form of a two-dimensional (2D) matrix, and outputs pixel signals corresponding to subject light incident on the plurality of pixels; and
a plurality of image-acquiring units that acquire the pixel signals output from the solid-state imaging device, and output image data corresponding to the acquired pixel signals,
wherein each of the plurality of image-acquiring units includes:
 a pixel signal-processing unit that sequentially acquires the pixel signals at a timing synchronized with a first clock signal, generates processed image data by performing a predetermined processing on the acquired pixel signals, and sequentially outputs the generated processed image data at a timing synchronized with a second clock signal; and
 an image data transfer unit that transfers the processed image data to a storage unit connected to a data bus to which an image-acquiring unit is connected as divided image data of a corresponding divided imaging region at the timing synchronized with the second clock signal,
divides an imaging region into two, one of the plurality of image-acquiring units outputting image data corresponding to the pixel signals acquired from one of two-divided imaging regions divided from the imaging region as first divided image data, and the other one of the plurality of image-acquiring units outputting image data corresponding to the pixel signals acquired from the other of the two divided imaging regions divided from the imaging region as second divided image data, and
acquires pixel signals of one of divided imaging regions obtained by dividing an imaging region in which all pixels arranged in the solid-state imaging device image the subject light by the number of the plurality of image-acquiring units, and outputs image data corresponding to the acquired pixel signal of the divided imaging region as divided image data.

2. The imaging device according to claim 1,
wherein the plurality of image-acquiring units correspond to the respective different divisional imaging regions, and
each of the image-acquiring units acquires the pixel signals of the corresponding divisional imaging region among the pixel signals sequentially output from the solid-state imaging device, and sequentially outputs the divisional image data corresponding to the acquired pixel signals.

3. The imaging device according to claim 2, wherein the image-acquiring unit includes:
the pixel signal-processing unit that generates processed image data by performing predetermined processing on the acquired pixel signals, and outputs the processed image data,
and the image data transfer unit that transfers the processed image data to the storage unit connected to a data bus to which the image-acquiring unit is connected as the divisional image data of the corresponding divisional imaging region.

4. The imaging device according to claim 3,
wherein the pixel signal-processing unit sequentially acquires the pixel signals of the corresponding divisional imaging region at a timing synchronized with a first clock signal, and sequentially outputs the generated processed image data at a timing synchronized with a second clock signal, and
the image data transfer unit transfers the processed image data to the storage unit at the timing synchronized with the second clock signal as the divisional image data.

5. The imaging device according to claim 4,
wherein a period of the first clock signal is a period at which the solid-state imaging device sequentially outputs the pixel signal, and
a period of the second clock signal is within a period obtained by multiplying the period of the first clock signal by the number of image-acquiring units provided in the imaging device.

6. The imaging device according to claim 5,
wherein the pixel signal-processing unit includes a buffer unit that sequentially holds image data corresponding to the pixel signals at the timing synchronized with the first clock signal, and outputs the held image data at the timing synchronized with the second clock signal.

7. The imaging device according to claim 6,
wherein the pixel signal-processing unit includes:
a horizontal direction-resizing unit that sequentially outputs horizontally processed image data obtained by performing a resizing process on the pixel signals corresponding to the pixels arranged in a column direction in the solid-state imaging device, and
a vertical direction-resizing unit that sequentially outputs vertically processed image data obtained by performing a resizing process on the horizontally processed image data in a row direction in the pixels arranged in the solid-state imaging device, and the vertical direction-resizing unit includes the buffer unit, causes the horizontally processed image data to be sequentially held in the buffer unit at the timing synchronized with the first clock signal, and sequentially outputs the vertically processed image data obtained by performing the resizing process in the column direction on the horizontally processed image data sequentially read from the buffer unit at the timing synchronized with the second clock signal.

8. The imaging device according to claim 1, wherein the imaging region is divided into a left divided imaging region and a right divided imaging region, one of the plurality of image-acquiring units outputs image data corresponding to the pixel signals acquired from the left divided imaging region as first divided image data, and the other one of the plurality of image-acquiring units outputs image data corresponding to the pixel signals acquired from the right divided imaging region as second divided image data.

9. The imaging device according to claim 8, wherein the left divided imaging region and the right divided imaging region are adjacent to each other at a position at which the imaging region is divided.

10. The imaging device according to claim 8, wherein, when each of the plurality of image-acquiring units performs a filter process or a resizing process on the acquired pixel signals, the left divided imaging region and the right divided imaging region have marginal regions which are adjacent to each other at a position at which the imaging region is divided, and the pixel signals included in the left divided imaging region and the right divided imaging region overlap in the marginal regions.

11. The imaging device according to claim 10, wherein an amount of pixel signals included in the marginal regions is decided according to the number of taps of a filter used in the filter process or the resizing process performed by each of the plurality of image-acquiring units.

12. The imaging device according to claim 2, wherein the number of image-acquiring units is two, the imaging region is divided into two, one of the image-acquiring units outputs image data corresponding to the pixel signals acquired from one of the two divisional imaging regions divided from the imaging region as first divisional image data, and the other of the image-acquiring units outputs image data corresponding to the pixel signals acquired from the other of the two divisional imaging regions divided from the imaging region as second divisional image data.

13. The imaging device according to claim 3, wherein the number of image-acquiring units is two, the imaging region is divided into two, one of the image-acquiring units outputs image data corresponding to the pixel signals acquired from one of the two divisional imaging regions divided from the imaging region as first divisional image data, and the other of the image-acquiring units outputs image data corresponding to the pixel signals acquired from the other of the two divisional imaging regions divided from the imaging region as second divisional image data.

14. The imaging device according to claim 4, wherein the number of image-acquiring units is two, the imaging region is divided into two, one of the image-acquiring units outputs image data corresponding to the pixel signals acquired from one of the two divisional imaging regions divided from the imaging region as first divisional image data, and the other of the image-acquiring units outputs image data corresponding to the pixel signals acquired from the other of the two divisional imaging regions divided from the imaging region as second divisional image data.

15. The imaging device according to claim 5, wherein the number of image-acquiring units is two, the imaging region is divided into two, one of the image-acquiring units outputs image data corresponding to the pixel signals acquired from one of the two divisional imaging regions divided from the imaging region as first divisional image data, and the other of the image-acquiring units outputs image data corresponding to the pixel signals acquired from the other of the two divisional imaging regions divided from the imaging region as second divisional image data.

16. The imaging device according to claim 6, wherein the number of image-acquiring units is two, the imaging region is divided into two, one of the image-acquiring units outputs image data corresponding to the pixel signals acquired from one of the two divisional imaging regions divided from the imaging region as first divisional image data, and the other of the image-acquiring units outputs image data corresponding to the pixel signals acquired from the other of the two divisional imaging regions divided from the imaging region as second divisional image data.

17. The imaging device according to claim 7, wherein the number of image-acquiring units is two, the imaging region is divided into two, one of the image-acquiring units outputs image data corresponding to the pixel signals acquired from one of the two divisional imaging regions divided from the imaging region as first divisional image data, and the other of the image-acquiring units outputs image data corresponding to the pixel signals acquired from the other of the two divisional imaging regions divided from the imaging region as second divisional image data.

18. The imaging device according to claim 1, wherein a period of the first clock signal is a period at which the solid-state imaging device sequentially outputs the pixel signal, and a period of the second clock signal is within a period obtained by multiplying the period of the first clock signal by the number of the plurality of image-acquiring units provided in the imaging device.

19. The imaging device according to claim 18, wherein the pixel signal-processing unit includes a buffer unit that sequentially holds image data corresponding to the pixel signals at the timing synchronized with the first clock signal, and outputs the held image data at the timing synchronized with the second clock signal.

20. The imaging device according to claim 19, wherein the pixel signal-processing unit includes:

a horizontal direction-resizing unit that sequentially outputs horizontally processed image data obtained by performing a resizing process on the pixel signals corresponding to the pixels arranged in a column direction in the solid-state imaging device, and a vertical direction-resizing unit that sequentially outputs vertically processed image data obtained by performing a resizing process on the horizontally processed image data in a row direction in the pixels arranged in the solid-state imaging device, and the vertical direction-resizing unit
includes the buffer unit,
causes the horizontally processed image data to be sequentially held in the buffer unit at the timing synchronized with the first clock signal, and
sequentially outputs the vertically processed image data obtained by performing the resizing process in the column direction on the horizontally processed image data sequentially read from the buffer unit at the timing synchronized with the second clock signal.

* * * * *